US010537837B2

(12) United States Patent
Haberkamp et al.

(10) Patent No.: US 10,537,837 B2
(45) Date of Patent: Jan. 21, 2020

(54) GRADIENT NANOFIBER FILTER MEDIA

(71) Applicant: CUMMINS FILTRATION IP, INC., Columbus, IN (US)

(72) Inventors: William C. Haberkamp, Cookeville, TN (US); Eric A. Janikowski, Jefferson, WI (US); Barry Mark Verdegan, Stoughton, WI (US); Christopher E. Holm, Madison, WI (US); Huanling Liu, Cookeville, TN (US); Kyle Ellison, Hermitage, TN (US); Mark T. Wieczorek, Cookeville, TN (US)

(73) Assignee: Cummins Filtration IP, Inc., Columbus, IN (US)

( * ) Notice: Subject to any disclaimer, the term of this patent is extended or adjusted under 35 U.S.C. 154(b) by 98 days.

(21) Appl. No.: 15/964,571

(22) Filed: Apr. 27, 2018

(65) Prior Publication Data

US 2018/0243675 A1    Aug. 30, 2018

Related U.S. Application Data

(62) Division of application No. 14/907,351, filed as application No. PCT/US2014/049434 on Aug. 1, 2014, now Pat. No. 9,987,578.
(Continued)

(51) Int. Cl.
*B01D 39/16* (2006.01)
*B01D 39/18* (2006.01)

(52) U.S. Cl.
CPC ......... *B01D 39/1623* (2013.01); *B01D 39/18* (2013.01); *B01D 2239/025* (2013.01);
(Continued)

(58) Field of Classification Search
CPC ............... B01D 39/1623; B01D 39/18; B01D 2239/025; B01D 2239/1233;
(Continued)

(56) References Cited

U.S. PATENT DOCUMENTS

| 6,746,517 B2 | 6/2004 | Benson et al. |
| 2006/0084340 A1 | 4/2006 | Bond et al. |

(Continued)

FOREIGN PATENT DOCUMENTS

| CN | 101132907 | 2/2008 |
| CN | 10952210 | 1/2011 |

(Continued)

OTHER PUBLICATIONS

International Search Report and Written Opinion for PCT/US2014/049434, dated Jan. 22, 2015, 20 pages.
(Continued)

*Primary Examiner* — Nam X Nguyen
*Assistant Examiner* — Julia L. Wun
(74) *Attorney, Agent, or Firm* — Foley & Lardner LLP

(57) ABSTRACT

Disclosed is a composite filter media. The composite filter media is formed from multiple layers of media material including a nanofiber media layer, where the layers are laminated, bound, or otherwise composited to each other. The composite filter media can comprise at least one nanofiber layer comprising polymeric media material having a geometric mean fiber diameter of about 100 nm to 1 μm, and fibers configured in a gradient such that ratio of the geometric mean diameter of fibers at the upstream face of the nanofiber layer to the geometric mean diameter of fibers at the downstream face of the nanofiber layer is about 1.1 to 2.8, preferably about 1.2 to 2.4.

18 Claims, 4 Drawing Sheets

Related U.S. Application Data

(60) Provisional application No. 61/861,797, filed on Aug. 2, 2013.

(52) U.S. Cl.
CPC ............... *B01D 2239/0668* (2013.01); *B01D 2239/0681* (2013.01); *B01D 2239/125* (2013.01); *B01D 2239/1216* (2013.01); *B01D 2239/1233* (2013.01)

(58) Field of Classification Search
CPC .... B01D 2239/1216; B01D 2239/0681; B01D 2239/125; B01D 2239/0668; B01D 2239/065
USPC .......... 210/504, 500.27, 503, 505, 491, 490, 210/508, 506, 172.4
See application file for complete search history.

(56) References Cited

U.S. PATENT DOCUMENTS

| | | |
|---|---|---|
| 2006/0137318 A1 | 6/2006 | Lim et al. |
| 2008/0086992 A1 | 4/2008 | Walz |
| 2009/0044702 A1 | 2/2009 | Adamek et al. |
| 2010/0038307 A1 | 2/2010 | Bates et al. |
| 2010/0215939 A1 | 8/2010 | Westbroek et al. |
| 2010/0282682 A1 | 11/2010 | Eaton et al. |
| 2010/0307119 A1 | 12/2010 | Leung et al. |
| 2011/0114554 A1 | 5/2011 | Li et al. |
| 2011/0198280 A1* | 8/2011 | Jones ................. B01D 39/2024 210/489 |
| 2011/0259813 A1 | 10/2011 | Wertz et al. |
| 2012/0137885 A1 | 6/2012 | Dullaert et al. |

FOREIGN PATENT DOCUMENTS

| | | |
|---|---|---|
| CN | 02470303 | 5/2012 |
| WO | WO 2010/088403 | 8/2010 |

OTHER PUBLICATIONS

Second office action issued for Chinese Patent Application No. 201480041084.1, dated Mar. 31, 2017, 12 pages.

* cited by examiner

Effect of Nanofiber Gradient on the Performance of Filter Media

| Media | Media Physical Properties | | | | | | | | ISO FTD Data | | PTI 0.5 μm Dust Data | |
|---|---|---|---|---|---|---|---|---|---|---|---|---|
| | Geometric Mean Diameter of Filtration Layer Fibers μm | Nanofiber Diameter Ratio upstream/downstream | P50 μm | P99 μm | P99/P50 | Air Permeability ft³/min. | Thickness mm | Basis weight g/m² | Particle Size such that βx=75 μm (c) | Capacity g/m² | Particle Size such that βx=75 μm (c) | Capacity g/m² |
| C | 4.18+1.71+2.42 | | 2.73 | 8.66 | 3.2 | 2.30 | 1.4 | 340 | 5.9 | 25.76 | 10.8 | 8.59 |
| D | 4.18+1.71+2.42 | | 3.14 | 10.21 | 3.3 | 2.64 | 1.5 | 310 | 9.7 | 78.78 | 19.2 | 34.85 |
| E | 0.38 | 1.0 | 4.39 | 5.15 | 1.2 | 7.20 | 0.17 | 31 | 4.6 | 31.31 | 5.2 | 14.50 |
| F | 0.30+0.45 | 0.7 | 3.37 | 4.44 | 1.3 | 7.20 | 0.17 | 31 | 4.4 | 27.27 | 4.5 | 10.61 |
| G | 0.45+0.30 | 1.5 | 3.37 | 4.44 | 1.3 | 7.20 | 0.17 | 31 | 4.7 | 31.82 | 4.9 | 18.69 |
| H | 0.57+0.26 | 2.2 | 3.37 | 4.44 | 1.3 | 7.20 | 0.17 | 31 | 4.6 | 43.43 | 4.8 | 21.21 |

FIGURE 2

Effect of Microfiber on the Performance of Nanofiber Gradient Media

| | Media Physical Properties | | | | | | | | PTI 0.5 μm Dust Data | | | | |
|---|---|---|---|---|---|---|---|---|---|---|---|---|---|
| Media | Geometric Mean Fiber Diameter of Filtration Layers upstream to downstream, μm | Microfiber to Nanofiber Diameter Ratio | P50 | P99 | P99/P50 | Air Permeability | Thickness | Basis weight | Filtration Ratio at Indicated Particle Size in μm(c) | | | Particle Size such that βx=75 | Capacity |
| | | | μm | μm | | ft³/min. | mm | g/m² | 4 | 6 | 10 | μm(c) | g/m² |
| I | 0.7 | - | 6.54 | 8.43 | 1.3 | 20.40 | 0.2 | 30 | 2.5 | 4.1 | 16.6 | >10 | 30.30 |
| J | (8.0+5.1+3.7)÷0.70 | 5.3 | 3.97 | 7.35 | 1.8 | 11.80 | 1.5 | 325 | 2.6 | 4.2 | 17.6 | >10 | 32.32 |
| K | (5.10+1.54+1.34)÷0.70 | 1.9 | 3.57 | 6.87 | 1.9 | 6.10 | 1.2 | 290 | 3.0 | 5.8 | 46.5 | >10 | 50.99 |
| L | (0.57+0.43) | - | 4.90 | 5.70 | 1.2 | 12.00 | 0.2 | 30 | 8.9 | 29.4 | 714 | 7.3 | 21.50 |
| M | 1.8+(0.57+0.43) | 3.2 | 4.80 | 5.80 | 1.2 | 9.20 | 0.4 | 68 | 7.0 | 21.5 | 625 | 7.6 | 20.50 |
| N | 1.5+(0.57+0.43) | 2.6 | 4.50 | 5.70 | 1.3 | 7.90 | 0.4 | 72 | 8.5 | 29.9 | 714 | 7.3 | 23.50 |
| O | 1.35+(0.57+0.43) | 2.4 | 4.30 | 5.70 | 1.3 | 7.30 | 0.4 | 70 | 7.6 | 26.0 | 20000 | 6.7 | 25.50 |

FIGURE 3

GRADIENT NANOFIBER FILTER MEDIA

CROSS REFERENCE TO RELATED APPLICATIONS

The present application is a divisional of U.S. patent application Ser. No. 14/907,351, filed Jan. 25, 2016, which is a National Stage of PCT Application No. PCT/US2014/049434 filed Aug. 1, 2014, which claims priority to U.S. Provisional Patent Application No. 61/861,797, filed Aug. 2, 2013. The contents of these applications are incorporated herein by reference.

BACKGROUND

The disclosed subject matter relates to composite filter media. In particular, the disclosed subject matter relates to composite filter media comprising multiple layers of laminated media material including nanofiber media layer.

Applications, such as on-board engine high pressure common rail fuel filter systems, are demanding. High levels of particle removal for fine particles should be maintained even under conditions of flow surges and vibration, as are encountered on operating engines. Particles 4 μm (c) or even smaller have been shown to damage fuel injectors, and beta ratios in excess of 64, and ideally higher are recommended. Further, these levels of removal should be maintained even when flow rates change rapidly, such as at engine start up or when the fuel throttle is rapidly adjusted, or when the engine vibrates. At the same time, customers and end-users insist that filter life not be shortened, while space constraints prevent the use of larger filters.

These challenges are further exacerbated in typical diesel fuel applications, where multiple filters are used in series. Multiple filters are typically used on modern diesel fuel systems. In many cases, a first filter FWS (Fuel Water Separator) or coalescing filter is used both to remove water and pre-filter coarser particles. This first filter or pre-filter results in a significant shift in contaminant particle size distribution and may adversely affect contaminant removal of a subsequent filter due to the removal of the coarser particles. Coarser particles tend to block the larger pores in a typical media used in these systems. The absence or reduced concentration of these coarser particles allows larger pores in the downstream filter or filter media to remain open to the flow, which in turn allows contaminant to pass through. This results in depressed removal in this size range.

In the past, the aforementioned challenges could be addressed by means of composite media with layers of media with relatively broad pore size distributions that provided graded particle capture, i.e., successive layers capturing nominally finer particles. However, much higher levels of contaminant removal for much finer particles are now required under transient conditions and highly efficient nanofibers are now required to achieve these levels of removal. This may result in shortened service life.

SUMMARY

Various embodiments involve the use of a composite filter media that contains a nanofiber layer with a composite filter media mean flow pore size smaller than about 10 μm and a narrow pore size distribution. The nanofiber layer has a gradient design such that the geometric mean fiber diameter of the upstream side is larger than the downstream side. The composite filter media may include additional layers, for example, a microfiber layer upstream of the nanofiber layer, such that the downstream face of this microfiber layer has a geometric mean fiber diameter that is larger than the upstream face of the nanofiber layer and within a configured range.

Disclosed is a composite filter media. The composite filter media is formed from multiple layers of media material including a nanofiber media layer, where the layers are laminated, bound, or otherwise composited to each other.

The composite filter media disclosed herein typically includes at least one layer of nanofiber filter media with a geometric mean fiber diameter of less than about 1 μm and typically between about 0.1 and 1.0 μm. Optional layers of fibrous media also may be present, for example, to provide support and strength to the composite filter media. The nanofiber layer may be further characterized by having a gradient structure such that the geometric mean fiber diameter of the nanofibers at the upstream side of the nanofiber layer is 1.1 to 2.8 times, or 1.2 to 2.4 times, or 1.2 to 1.7 times, or 1.2 to 1.5 times greater than the geometric mean fiber diameter of the nanofibers at the downstream side of the nanofiber layer. Typically, the mean flow pore size of the nanofiber layer is smaller than about 10 μm, and preferably less than about 9 μm, less than about 8 μm, less than about 7 μm, or less than about 6 μm. In some embodiments, the mean flow pore size of the nanofiber layer can be about 5 μm, or about 4 μm, or about 3 μm, or about 2 μm, or about 1 μm.

Further, the composite filter media may be characterized by having a narrow pore size distribution with a ratio of P99 to P50 of less than about 2 and typically about 1.2 to about 1.6. Optional layers of microfiber filter media with geometric mean fiber diameter of greater than about 1 micron (i.e., a microfiber layer) may be present upstream of the nanofiber layer. If a microfiber layer is present upstream and adjacent to the nanofiber layer, the fiber diameter of the fibers at the downstream face of the microfiber layer typically is about 1.2 to 2.8, or about 1.2 to 2.4 times larger than the fiber diameter of the fibers at the upstream face of the nanofiber layer. Multiple microfiber layers upstream of the nanofiber layer can be arranged in a gradient fashion such that the fiber diameter of a microfiber layer decreases by about 1.2 to about 2.4 times with each successive layer as one proceeds from upstream to downstream towards the nanofiber layer. For example, the ratio of the diameter of fibers at the downstream face of an upstream layer of a microfiber layer to the diameter of fibers at the upstream face of an adjacent downstream microfiber layer typically is between about 1.2 and about 2.4, and preferably between about 1.2 and about 1.6.

Suitable polymeric material may include, but is not limited to thermoplastic materials such as polyamide material, polyester material, polysulfone material, polypropylene material, fluoropolymer including polytetrafluoroethylene or ethylene-chlorotrifluoroethylene copolymer, or other organic polymeric material having suitable geometric, structural, and chemical resistance properties. The layers of the composite material typically are laminated, bonded, or otherwise composited via thermal, chemical, or non-chemical treatment, or ultrasonic bonding. In some embodiments, two or more of the layers are bonded via ultrasonic treatment. In other embodiments, two or more of the layers are bonded via applying an adhesive.

BRIEF DESCRIPTION OF THE DRAWINGS

FIG. 2 shows the effect of nanofiber gradient on the performance of filter media.

FIG. 3 shows the effect of microfiber on the performance of nanofiber gradient media.

DETAILED DESCRIPTION

Figure 1:
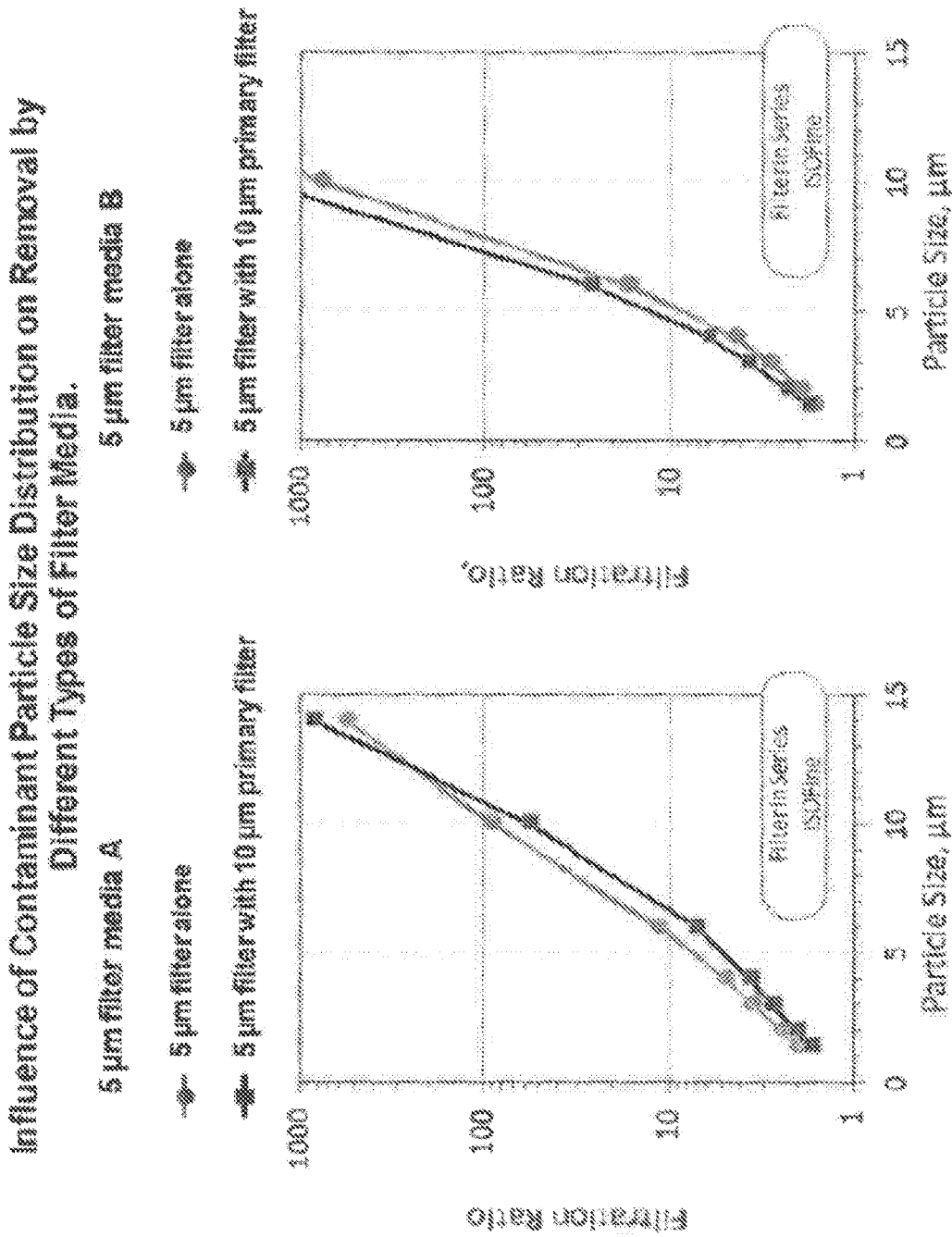
FIG. 1 shows the influence of contaminant particle size distribution on removal by different types of filter media.

The present invention is described herein using several definitions, as set forth below and throughout the application.

Unless otherwise specified or indicated by context, the terms "a", "an", and "the" mean "one or more." For example, "a layer" should be interpreted to mean "one or more layers."

As used herein, "about," "approximately," "substantially," and "significantly" will be understood by persons of ordinary skill in the art and vary to some extent on the context in which they are used. If there are uses of these terms which are not clear to persons of ordinary skill in the art given the context in which they are used, "about" and "approximately" will mean plus or minus 10% of the particular term and "substantially" and "significantly" will mean plus or minus >10% of the particular term.

As used herein, the terms "include" and "including" have the same meaning as the terms "comprise" and "comprising" in that these latter terms are "open" transitional terms that do not limit claims only to the recited elements succeeding these transitional terms. The term "consisting of," while encompassed by the term "comprising," should be interpreted as a "closed" transitional term that limits claims only to the recited elements succeeding this transitional term. The term "consisting essentially of," while encompassed by the term "comprising," should be interpreted as a "partially closed" transitional term which permits additional elements succeeding this transitional term, but only if those additional elements do not materially affect the basic and novel characteristics of the claim.

Disclosed is a composite filter media. The composite filter media is formed from multiple layers of media material that are laminated or bound to each other. Typically, the media has the following characteristics:

A pore size distribution for the composite filter media such that the 50% flow pore size or P50, is between 0 and about 10 µm, preferably between 0 and about 7 µm, and more preferably between 0 and about 5 µm. Further, the ratio of the 99% flow pore size or P99 to P50 for the composite typically is less than about 2, and preferably between about 1.2 and about 1.6.

At least one layer of media whereby its geometric mean fiber diameter, DL, is less than 1 µm, namely a "nanofiber layer" or "NL." Further, the geometric mean fiber diameter of the fibers at the upstream side of the nanofiber layer is between about 1.1 and about 2.8 times, preferable between 1.2 about 2.4 times, and more preferably between about 1.2 and about 1.7 or between about 1.2 and about 1.5 times, larger than the mean fiber diameter of the fibers at the downstream side of the nanofiber layer. In some embodiments, the thickness of the nanofiber layers is preferably greater than 40 µm, or greater than about 80 µm, or greater than about 100 µm. In some embodiments, the nanofiber layer comprises a first sublayer, a second sublayer downstream of the first sublayer, and optionally further sublayers; wherein the sublayers are arranged in a gradient fashion such that the first sublayer has a larger geometric mean fiber diameter than the second sublayer, preferably in a ratio of about 1.1-2.8 or about 1.2-2.4. In some embodiments, the composite filter media comprises at least a first nanofiber layer, a second nanofiber layer downstream of the first nanofiber layer, and optionally further nanofiber layers; wherein the first nanofiber layer has a larger geometric mean fiber diameter than the second nanofiber layer, preferably in a ratio of about 1.1-2.8 or about 1.2-2.4; and wherein optionally the first nanofiber layer and the second nanofiber layer are separated by an intervening layer (e.g., a coarse nanofiber layer or a microfiber layer).

The layers just described are polymeric, such as thermoplastic materials including polyamide, polyester, polysulfone, polypropylene material, fluoropolymer including polytetrafluoroethylene or ethylene-chlorotrifluoroethylene copolymer, or other organic polymeric material with suitable geometric, structural and chemical resistance properties and are laminated, bound, or otherwise composited to one another by thermal (e.g., via ultrasonic treatment) or other chemical or non-chemical treatments (e.g., via applying adhesive).

The composite filter media may have the following additional characteristics:

An optional layer upstream of the previously described nanofiber layer(s) that has a geometric mean fiber diameter greater than 1 µm, namely a "microfiber layer" or "ML." The microfiber layer typically comprises microfibers such that the ratio of the geometric mean diameter of fibers at the downstream face of the microfiber layer to the geometric mean diameter of fibers at the upstream face of the nanofiber layer is between about 1.2 and about 2.8, preferably between about 1.2 and about 2.4, and more preferably between about 1.2 and about 1.7 or about 1.2 and about 1.6.

Additionally one or more optional microfiber layers of fibrous filter media upstream of the microfiber layer described above. For nomenclature purposes, the optional microfiber layers may be referenced as follows, from upstream to downstream ML4>ML3>ML2>ML1>NL. These preceding optional microfibers layers comprise fibers with a geometric mean diameter that increases by a factor of between about 1.2 and about 2.8 compared to the geometric mean diameter of fibers in a subsequent downstream microfiber layer or nanofiber layer, preferably between about 1.2 and about 2.4, or between about 1.2 and about 1.7, or between about 1.2 and about 1.6. For example, if the geometric mean fiber diameter of fibers at the upstream side of the nanofiber layer is 0.7 µm, then the subsequent geometric fiber diameters of fibers in the corresponding microfiber layers could be as follows as one proceeds in an upstream direction: ML 1=1.0 µm (1.0/0.7=~1.4); ML2=1.6 µm (1.6/1=1.6), ML3=2.4 µm (2.4/1.6=1.5); and ML4=3.5 µm (3.5/2.4=~1.5).

In the following description and tables, various measurement techniques and test methods are referenced. The geometric mean fiber diameter of the layers making up the composite filter media was determined by scanning electron microscopy. For the gradient nanofiber layer, the geometric mean fiber diameter of fibers at the upstream side and downstream side were separately determined and are reported.

The "nanofiber layer diameter ratio" is the ratio of the upstream geometric mean fiber diameter (e.g., at the upstream face of the nanofiber layer) to the downstream geometric mean fiber diameter (e.g., at the downstream face of the nanofiber layer). "P50" and "P99" refer to the composite media pore size such that the indicated percentage of the total flow, 50% or 99%, respectively, passes through pores equal to or smaller than the indicated size as determined using a Porous Materials Inc. Porometer and Porewick® or other suitable fluid. For example, a P50 of 5 μm indicates that 50% of the flow through the media is passing through pores having an effective diameter of ≤5 μm. The P99 to P50 ratio or P99/P50 is the ratio of P99 to P50 for the composite filter media and is a measure of breadth of the media pore size distribution. Air permeability was measured by ASTM D737. Thickness was measured by ASTM D5729. The basis weight was measured by ASTM D1777.

Contaminant removal and dust holding capacity were determined using the ISO 19438 multipass filter test method modified as follows. Test filters were challenged with either ISO Fine Test Dust (ISO FTD) or Powder Technology Inc. 0-5 micron test dust (PTI). ISO FTD is the contaminant called for in the standard test. PTI was used to simulate the contaminant particle size distribution in applications where contaminants have a fine particle size distribution, such as secondary filters for fuel systems or hydraulic applications. In the data, contaminant removal results are expressed as a single number corresponding to the particle size that yields the filtration or beta ratio of 75. Filtration ratio or beta is defined as the ratio of the time-weighted average number concentration of particles larger than the indicated size upstream of the filter to that downstream of the filter. Thus, a filtration or beta ratio of 75 indicates a concentration of particles larger than an indicated size upstream of a filter that is 75 times higher than the concentration of particles larger than the indicated size downstream of the filter. Filtration or beta ratios are typically expressed in the form of βx=Y, where X refers to the particle size in μm(c) and Y refers to the actual value of the filtration or beta ratio as discussed. Removal efficiency may be calculated as a percentage (e.g., greater than about 95%, 96%, 97%, 98%, or 99%). The size corresponding to a given filtration ratio is determined by interpolation of filtration ratio versus particle size data for the filter media.

Particle size distribution has been previously assessed as has the need to design filters to deal with particle size distributions enriched in fine particles, smaller than 4 μm(c). (See, e.g., U.S. Published Application Nos.: 2011/0233152; 2010/0050871; 2011/0168647; 2011/0168621; 2012/0292252; the contents of which are incorporated herein by reference in their entireties). However, based on what is known in the art, when one considers the case of a primary filter having a mean flow pore size of about 10 μm and a secondary filter having a mean flow pore size of about 5 μm mean pore size, it would be expected that the filtration in each stage and subsequent particle removal would be cumulative. However, the results discussed below indicate that this is not necessarily the case.

FIG. 1 provides results where particle removal for two types of secondary filter media (i.e., Media A and Media B) using the ISO19438 multipass filter test method was compared:

As shown in FIG. 1, Media A is typical wet-laid microfiber filter media with a P99 to P50 ratio greater than 3. Media B is a nanofiber filter media with a P99 to P50 ratio of approximately 2. The responses of these two types of media to exposure to a finer particle size distribution are very different. Particle removal is reduced when Media A is challenged with the finer dust size distribution created by a primary filter when compared to ISO Fine Test Dust. On the other hand, particle removal by Media B is relatively unaffected by the dust size distribution. This unexpected result may be attributed to the differences in both fiber diameter (i.e., microfiber with Media A versus nanofiber with Media B), and pore size distribution (i.e., broader for Media A than Media B). In the prior art, the effect of fiber diameter and/or pore size distribution on dust-holding capacity and filter service life as a function of particle size distribution have not been considered. Although Media B was observed to perform better in this test, application of the media design strategy used for Media B may shorten service life in the field. A new approach to filter media design is needed to achieve: both (1) high contaminant removal for fine particles even when challenged with a finer particle size distribution and (2) improved service life.

FIG. 2 shows the shortcomings of existing approaches to this challenge and the benefits of the presently disclosed composite filter media using filter media possessing similar mean flow pore size (P50) and 4 μm(c) filtration ratio characteristics:

As shown in FIG. 2, Media C and D) are conventional microfiber media that lack nanofiber-scale fibrous material and have a P99 to P50 ratio greater than 2, whereas Media E, F, G, and H comprise nanofiber-scale fibrous material and have a P99 to P50 ratio less than 2. From the results, it can be seen that Media C and D challenged with ISO FTD generally exhibit filtration ratios βx of 75 at particle sizes, X, that are significantly larger than that obtained with Media E, F, G, and H, even though the 4 μm(c) filtration ratios are similar. Thus, these conventional microfiber media are less effective at removing contaminants, particularly at larger particle sizes than the nanofiber media. This result, which is unfavorable for demanding applications like fuel and hydraulic filtration, may be attributed to their broader pore size distribution which allows larger particles to penetrate the media. Media C has dust-holding capacity in the same range as nanofiber Media E through J when challenged with ISO FTD. However, when challenged with a finer dust (i.e., PTI 0-5 μm dust) removal drops to unfavorable levels well below that of the nanofiber media as indicated by the βx=75 results. In addition, Media C, which exhibited the best removal of the conventional media, exhibits a lower capacity than any of the nanofiber media. These results demonstrate that the composite filter media of the present application comprising a nanofiber gradient media layer provides both better removal and, at the same time, better capacity or service life than existing filter media when challenged with a contaminant possessing a fine particle size distribution. Notably, these results were obtained using media containing nanofiber media with a mean flow pore size of less than about 7 to 10 μm and narrow pore size distribution (i.e., P99 to P50 ratio less than 2).

A comparison of Media E through H further demonstrates the benefit of a gradient nanostructure to achieve both high removal and capacity for contaminant with fine particle size distribution, as shown in FIG. 2. The nanofiber diameter ratio (i.e., the ratio of the geometric mean fiber diameter on the upstream side of the nanofiber layer to that of the downstream side of the nanofiber layer) may be used to quantify the gradient structure. Thus, a fiber diameter ratio of 1 refers to a media without a gradient structure. A ratio less than 1 indicates that the upstream fibers are finer than the downstream fibers, while a ratio greater than 1 indicates that the upstream fibers are coarser than the downstream fibers. This ratio can be determined readily by using a scanning electron microscope to determine the respective geometric mean fiber diameter on each side of the nanofiber media or layer. Media E, which has a fiber diameter ratio of 1, exhibits a relatively high ISO FTD capacity, but one of the lowest PTI capacities. Media F, which has a nanofiber diameter ratio of about 0.7, exhibits the lowest ISO FTD and PTI capacity. On the other hand, Media G, which has a fiber diameter ratio of 1.5, exhibits nearly the same ISO FTD capacity as Media E, but nearly 30% higher PTI capacity. The improvement is even greater for Media H, which has a nanofiber diameter ratio of 2.2. Media F, G and H all exhibit better removal characteristics than Media E with PTI dust. Together, the results demonstrate that a nanofiber gradient, with a nanofiber diameter ratio between about 1.1 and 2.8, and preferably between about 1.2 and 2.4, improves capacity and service life for applications involving fine contaminant particle size distributions. These benefits might diminish when the mean flow pore size, P50, of the nanofiber exceeds about 7 to 10 μm or when the ratio of P99 to P50 exceeds about 2 to 3. This unexpected result has not been observed previously.

In order to further improve performance, notably capacity with a contaminant possessing a fine particle size distribution, the interaction between any upstream microfiber layers of media and the nanofiber layer were assessed. FIG. 3 summarizes the results of a series of experiment designed to optimize PTI dust capacity and removal by manipulating the fiber diameter of the microfiber layers upstream of the nanofiber.

In these results, one design parameter is the microfiber to nanofiber diameter ratio, defined here as the ratio of the geometric mean fiber diameter of the downstream side of the microfiber (>1 μm) layer or layers to that of the upstream side of the nanofiber layer or layers. As shown in FIG. 3, Media I, J and K explore this parameter using 0.7 μm diameter nanofiber. Media J with a ratio of 5.3 exhibited some improvement over Media I which lacked any upstream microfiber layer. However, Media K with a ratio of 1.9 exhibited a nearly 70% increase in capacity, as well as, an increase in contaminant removal at all particle sizes. This unexpected level of improvement for a fine particle size distribution may be attributed to the gradual transition from the broad pore size distribution microfiber media to the narrow pore size distribution of the nanofiber media.

The second set of data shown in FIG. 3 related to Media L, M, N, and O, demonstrate the effect of the microfiber to nanofiber ratio for a gradient nanofiber composite media. These media possess the same nanofiber gradient structure with 0.57 μm fibers on the upstream side and 0.43 fibers on the downstream side, but differ in terms of microfiber diameter to nanofiber diameter ratio. In the absence of an upstream microfiber layer as in Media L, the gradient nanofiber has a PTI capacity of 21.50 grams per square meter (g/m²). Contrary to teachings in the prior art, the addition of a fine upstream microfiber layer with microfiber diameter to nanofiber diameter ratio of 3.2 as in Media M, actually decreases the PTI capacity to 20.50 g/m². Rather than increasing capacity and removal, it decreased both, which would result in reduced equipment protection and shorter service life in the field. On the other hand, Media N and O, having microfiber to nanofiber ratios of 2.6 and 2.4, respectively, (which approach the microfiber to nanofiber ratios of Media K as previously discussed), exhibited increased PTI capacity as compared to Media L. This shows that when the microfiber diameter to nanofiber diameter ratio is less than about 2.8, and ideally less than about 2.4, capacity can be further enhanced over what is obtained using nanofiber gradient media alone. This enhancement in performance for nanofiber gradient media in removing a contaminant possessing a fine contaminant particle size distribution can be realized when the microfiber diameter to nanofiber diameter ratio is between 1.2 and 2.8.

In the preceding examples, the nanofiber layer was supported by a downstream scrim layer. The scrim layer may be any suitable polymeric or cellulose media with a larger mean flow pore size than the composite, as a whole, that structurally supports the nanofiber layer preferably during media production and in use. In some embodiments, the scrim or support layer comprises a mixture of cellulose material and polymeric material, such as a cellulose-based layer comprising about 10 to 30 wt. % of polymeric fibers, which can be advantageous for ultrasonically bonding the entire structure. Additional layers of media with geometric mean fiber diameter greater than 1 μm, as in Media J and K, may also be incorporated into the composite upstream of the nanofiber layer, such as the capacity enhancement layer just discussed, and/or other layers to provide support or other functional benefits. Methods for producing polymeric microfiber and nanofiber are known in the art. In general, the gradient can be produced by making individual layers with the described characteristics and the various layers, along with any microfiber and supporting layers, laminated, bonded, or otherwise composited via thermal, chemical, or non-chemical treatment.

Figure 4:
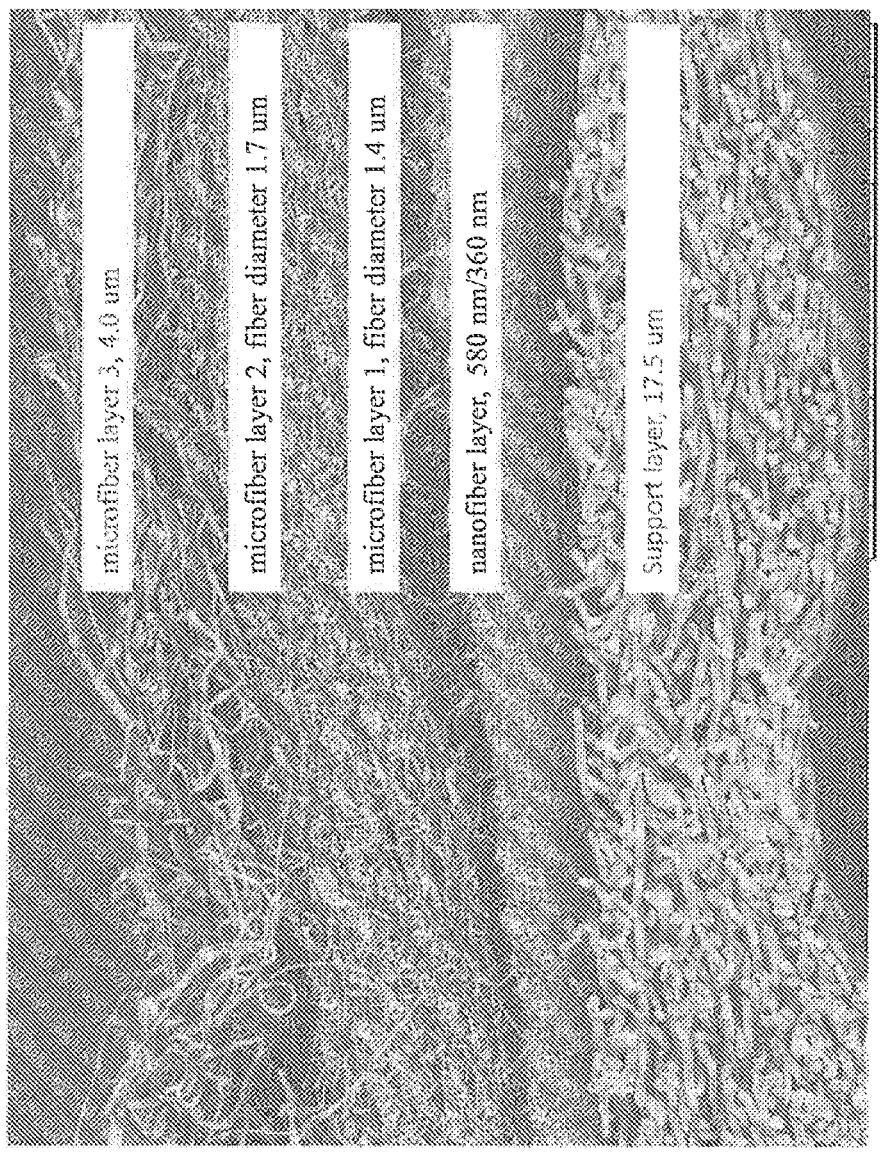
FIG. 4 shows an SEM image of one embodiment of the filter media described herein.

FIG. 4 shows one embodiment of the composite filter media described herein (Media P), which comprises, from upstream to downstream, a microfiber layer (3) having a geometrical mean fiber diameter of about 4.0 μm, a microfiber layer (2) having a geometrical mean fiber diameter of about 1.7 μm, at microfiber layer (1) having a geometrical mean fiber diameter of about 1.4 μm, a nanofiber layer having a geometric mean fiber diameter of about 580 nm on the upstream side and a geometric mean fiber diameter of about 360 nm on the downstream side of the nanofiber layer, and a support layer having a geometrical mean fiber diameter of about 17.5 μm.

ADDITIONAL EMBODIMENTS OF COMPOSITE FILTER MEDIA

Embodiment 1

A composite filter media comprising a first microfiber layer upstream of a nanofiber layer, wherein the nanofiber layer comprises polymeric media material having a geometric mean fiber diameter of about 100 nm to 1 μm, wherein the nanofiber layer has a upstream side and a downstream side and a gradient design, wherein the upstream side of the nanofiber layer has a larger geometric mean fiber diameter than the downstream side of the nanofiber layer.

Embodiment 2

The composite filter media of Embodiment 1, wherein the ratio of the geometric mean diameter of fibers at the upstream face of the nanofiber layer to the geometric mean diameter of fibers at the downstream face of the nanofiber layer is about 1.1 to 2.8.

Embodiment 3

The composite filter media of any of Embodiments 1 to 2, wherein the ratio of the geometric mean diameter of fibers at the upstream face of the nanofiber layer to the geometric mean diameter of fibers at the downstream face of the nanofiber layer is about 1.2 to 2.4.

Embodiment 4

The composite filter media of any of Embodiments 1 to 3, wherein the ratio of the geometric mean diameter of fibers at the upstream face of the nanofiber layer to the geometric mean diameter of fibers at the downstream face of the nanofiber layer is about 1.2 to 1.5.

Embodiment 5

The composite filter media of any of Embodiments 1 to 4, wherein the composite filter media has a mean flow pore size P50 of about 0 to 10 µm.

Embodiment 6

The composite filter media of any of Embodiments 1 to 5, wherein the composite filter media has a mean flow pore size P50 of about 0 to 7 µm or about 0 to 5 µm.

Embodiment 7

The composite filter media of any of Embodiments 1 to 6, wherein the composite filter media has a pore size distribution such that P99/P50 is less than about 2.

Embodiment 8

The composite filter media of any of Embodiments 1 to 7, wherein the composite filter media has a pore size distribution such that P99/P50 is about 1.2 to 1.6.

Embodiment 9

The composite filter media of any of Embodiments 1 to 8, wherein the nanofiber layer comprises polyamide, polyester, polysulfone, polypropylene, polytetrafluoroethylene, and/or ethylene-chlorotrifluoroethylene copolymer.

Embodiment 10

The composite filter media of any of Embodiments 1 to 9, wherein the ratio of the geometric mean diameter of fibers at the downstream face of the first microfiber layer to the geometric mean diameter of fibers at the upstream face of the nanofiber layer is about 1.2 to 2.8.

Embodiment 11

The composite filter media of any of Embodiments 1 to 10, wherein the ratio of the geometric mean diameter of fibers at the downstream face of the first microfiber layer to the geometric mean diameter of fibers at the upstream face of the nanofiber layer is about 1.2 to 2.4.

Embodiment 12

The composite filter media of any of Embodiments 1 to 11, wherein the geometric mean diameter of fibers of the first microfiber layer is about 1 to 1.8 µm.

Embodiment 13

The composite filter media of any of Embodiments 1 to 12, further comprising a second microfiber layer, wherein the ratio of the geometric mean diameter of fibers at the downstream face of the second microfiber layer to the geometric mean diameter of fibers at the upstream face of the first microfiber layer is about 1.2 to 2.8.

Embodiment 14

The composite filter media of any of Embodiments 1 to 13, further comprising a support layer downstream of the nanofiber layer, wherein the support layer comprises polymeric material, cellulose material, or a combination thereof.

Embodiment 15

The composite filter media of any of Embodiments 1 to 14, wherein the composite filter media has a mean flow pore size P50 of about 0 to 10 µm and a pore size distribution such that P99/P50 of less than about 2.

Embodiment 16

The composite filter media of any of Embodiments 1 to 15, wherein the composite filter media has a mean flow pore size P50 of about 0 to 5 µm and a pore size distribution such that P99/P50 of about 1.2 to 1.6.

Embodiment 17

The composite filter media of any of Embodiments 1 to 16, wherein the nanofiber layer has a thickness of at least about 40 µm.

Embodiment 18

The composite filter media of any of Embodiments 1 to 17, wherein the nanofiber layer has a thickness of at least about 80 µm.

Embodiment 19

The composite filter media of any of Embodiments 1 to 16, wherein the nanofiber layer comprises a first sublayer upstream of a second sublayer, wherein the first sublayer has a larger geometric mean fiber diameter than the second sublayer, preferably in a ratio of about 1.1 to 2.8 or about 1.2 to 2.4.

In the foregoing description, it will be readily apparent to one skilled in the art that varying substitutions and modifications may be made to the invention disclosed herein without departing from the scope and spirit of the invention. The invention illustratively described herein suitably may be practiced in the absence of any element or elements, limitation or limitations which is not specifically disclosed herein. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention. Thus, it should be understood that although the present invention has been illustrated by specific embodiments and optional features, modification and/or variation of the concepts herein disclosed may be resorted to by those skilled in the art, and that such modifications and variations are considered to be within the scope of this invention.

The invention claimed is:

1. A composite filter media comprising multiple layers of media material, wherein: the composite filter media comprises at least one nanofiber layer that comprises polymeric media material having a geometric mean fiber diameter of less than 1 μm; the composite filter media has a pore size distribution such that P99/P50 is less than 2, wherein P50 and P99 are the pore sizes such that 50% and 99%, respectively, of a total flow passes through pore sizes equal to or smaller than P50 and P99; and the composite filter media comprises a microfiber layer upstream of and adjacent to the nanofiber layer, the microfiber comprising microfibers such that the ratio of the geometric mean diameter of fibers at the downstream face of the microfiber layer to the geometric mean diameter of fibers at the upstream face of the nanofiber layer is between 1.2 and 2.8.

2. The media of claim 1, further comprising another microfiber layer upstream of the microfiber layer adjacent to the nanofiber layer, namely from upstream to downstream microfiber layer 2 (ML2), microfiber layer 1 (ML1), and nanofiber layer (NL), wherein ML2 comprises microfibers such that the ratio of the geometric mean diameter of fibers at the downstream face of ML2 to the geometric mean diameter of fibers at the upstream face of ML1 is between 1.2 and 2.8.

3. The composite filter media of claim 2, further comprising another microfiber layer upstream of ML2, namely microfiber layer 3 (ML3), wherein ML3 comprises microfibers such that the ratio of the geometric mean diameter of fibers at the downstream face of ML3 to the geometric mean diameter of fibers at the upstream face of ML2 is between 1.2 and 2.8.

4. The composite filter media of claim 1, wherein the composite filter media has a mean flow pore size P50 of between 0 and 7 μm.

5. The composite filter media of claim 1, wherein the media material of all layers comprises polymeric material.

6. The composite filter media of claim 5, wherein the polymeric material comprises one of polyamide material, polyester material, polypropylene, fluoropolymer, or polysulfone material.

7. The composite filter media of claim 1 wherein the media material of the nanofiber layer is polyamide material.

8. The composite filter media of claim 1, wherein the media material of the nanofiber layer is polyester material.

9. The composite filter media of claim 1, further comprising a support layer downstream of the nanofiber layer.

10. The composite filter media of claim 9, wherein the support layer comprises polymeric material.

11. The composite filter media of claim 9, wherein the support layer comprises cellulose material.

12. The composite filter media of claim 1, wherein two or more of the layers are bonded via thermal treatment.

13. The composite filter media of claim 12, wherein the thermal treatment is ultrasonic treatment.

14. The composite filter media of claim 1, wherein two or more of the layers are bonded via adhesive.

15. A composite filter media comprising multiple layers of media material, wherein: the composite filter media comprises at least one nanofiber layer that comprises polymeric media material having a geometric mean fiber diameter of less than 1 μm; the composite filter media has a mean flow pore size of less than about 10 μm the composite filter media has a pore size distribution such that P99/P50 is less than about 2, wherein P50 and P99 are the pore sizes such that 50% and 99%, respectively, of a total flow passes through pore sizes equal to or smaller than P50 and P99; and the nanofiber layer comprises a first sublayer upstream of a second sublayer, wherein the first sublayer has a larger geometric mean fiber diameter than the second sublayer.

16. The composite filter media of claim 15, wherein the nanofiber layer has a thickness of at least 40 μm; and wherein the nanofiber layer comprises fibers configured from one or more sublayers in a gradient such that ratio of the geometric mean diameter of fibers in the first sublayer to the geometric mean diameter of fibers in the second sublayer is between 1.1 and 2.8.

17. The composite filter media of claim 15, wherein the nanofiber layer has a thickness of at least 100 μm; and wherein the nanofiber layer comprises fibers configured from one or more sublayers in a gradient such that ratio of the geometric mean diameter of fibers in the first sublayer to the geometric mean diameter of fibers in the second sublayer is between 1.2 and 2.4.

18. A composite filter media comprising multiple layers of media material, wherein: the composite filter media has a mean flow pore size of less than about 10 μm; the composite filter media has a pore size distribution such that P99/P50 is less than about 2, wherein P50 and P99 are the pore sizes such that 50% and 99%, respectively, of a total flow passes through pore sizes equal to or smaller than P50 and P99; the composite filter media comprises a first nanofiber layer, a second nanofiber layer downstream of the first nanofiber layer, and optionally further nanofiber layers; wherein the first nanofiber layer has a larger geometric mean fiber diameter than the second nanofiber layer; and wherein the first nanofiber layer and the second nanofiber layer are separated by an intervening layer.

* * * * *